United States Patent
Imaoka

(10) Patent No.: US 9,255,433 B2
(45) Date of Patent: Feb. 9, 2016

(54) WINDOW REGULATOR

(71) Applicant: HI-LEX CORPORATION, Takarazuka-shi, Hyogo (JP)

(72) Inventor: Takayuki Imaoka, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 0 days.

(21) Appl. No.: 14/354,522

(22) PCT Filed: Oct. 26, 2012

(86) PCT No.: PCT/JP2012/077696
§ 371 (c)(1),
(2) Date: Apr. 25, 2014

(87) PCT Pub. No.: WO2013/062078
PCT Pub. Date: May 2, 2013

(65) Prior Publication Data
US 2014/0237900 A1 Aug. 28, 2014

(30) Foreign Application Priority Data
Oct. 26, 2011 (JP) .................................. 2011-234949

(51) Int. Cl.
*E05F 11/48* (2006.01)
*F16F 15/22* (2006.01)

(52) U.S. Cl.
CPC ............... *E05F 11/488* (2013.01); *E05F 11/48* (2013.01); *E05F 11/483* (2013.01);
(Continued)

(58) Field of Classification Search
CPC ....... E05F 11/48; E05F 11/481; E05F 11/483; E05F 11/485; E05F 11/486; E05F 11/488; E05F 7/04; F16F 15/22

USPC .............................................. 49/348, 349, 352
See application file for complete search history.

(56) References Cited

U.S. PATENT DOCUMENTS 2,969,416 A * 1/1961 McGavern ............... H02G 7/14
174/42
3,644,660 A * 2/1972 Dulhunty ........................ 174/42
(Continued)

FOREIGN PATENT DOCUMENTS

JP 04-083008 A 3/1992
JP 08-209746 A 8/1996
(Continued)

OTHER PUBLICATIONS

US 8,893,437, 11/2014, Galliot et al. (withdrawn).*
(Continued)

*Primary Examiner* — Katherine Mitchell
*Assistant Examiner* — Marcus Menezes
(74) *Attorney, Agent, or Firm* — Global IP Counselors, LLP

(57) ABSTRACT

A window regulator which attenuates vibrations of a wire, which are generated when the door is closed while a window glass is constrained at the top end of the window, to suppress the generation of an abnormal noise. The window regulator includes a carrier plate coupled to a vehicle window glass, a driving unit which lifts and lowers the carrier plate and is disposed below a lower limit of lifting and lowering of the carrier plate, a lifting wire having one end coupled to the carrier plate and another end coupled to the driving unit via a direction-changing member, and a lowering wire having ends coupled to the carrier plate and the driving unit, respectively. An attenuation member is provided on the lifting wire interposed between the direction-changing member and the driving unit and makes contact with the lifting wire to attenuate vibrations when the lifting wire vibrates.

3 Claims, 4 Drawing Sheets

(52) U.S. Cl.
CPC ............ *E05F 11/485* (2013.01); *E05F 11/486* (2013.01); *F16F 15/22* (2013.01); *E05Y 2800/422* (2013.01); *E05Y 2800/678* (2013.01); *E05Y 2900/55* (2013.01)

(56) References Cited

U.S. PATENT DOCUMENTS

| | | | | |
|---|---|---|---|---|
| 3,826,339 | A | * | 7/1974 | Brokaw ..................... 188/381 |
| 4,313,282 | A | * | 2/1982 | Hagemann et al. ............ 49/352 |
| 4,480,409 | A | * | 11/1984 | Hara ............................. 49/352 |
| 4,644,695 | A | * | 2/1987 | Shiraishi et al. .............. 49/352 |
| 4,727,681 | A | * | 3/1988 | Kinoshita et al. ............. 49/352 |
| 5,505,022 | A | * | 4/1996 | Shibata et al. ................. 49/352 |
| 6,088,965 | A | * | 7/2000 | Fukumoto et al. ............. 49/352 |
| 6,151,833 | A | * | 11/2000 | Gmurowski et al. ........... 49/352 |
| 6,408,572 | B1 | * | 6/2002 | Uchimura et al. ............. 49/352 |
| 6,553,718 | B2 | * | 4/2003 | Arquevaux et al. ............ 49/352 |
| 7,631,458 | B2 | * | 12/2009 | Moriyama et al. ............ 49/352 |
| 2013/0283697 | A1 | * | 10/2013 | Galliot et al. .................. 49/352 |

FOREIGN PATENT DOCUMENTS

| | | |
|---|---|---|
| JP | 08-226277 A | 9/1996 |
| JP | 2010-116761 A | 5/2010 |

OTHER PUBLICATIONS

International Search Report in PCT/JP2012/077696 dated Oct. 26, 2012.

* cited by examiner

WINDOW REGULATOR

CROSS-REFERENCE TO RELATED APPLICATIONS

This U.S. National stage application claims priority under 35 U.S.C. §119(a) to Japanese Patent Application No. 2011-234949, filed in Japan on Oct. 26, 2011, the entire contents of Japanese Patent Application No. 2011-234949 are hereby incorporated herein by reference.

BACKGROUND

1. Field of the Invention

The present invention relates to a window regulator provided to a vehicle door and the like.

2. Background Information

Heretofore, in wire-type window regulators for moving a window glass of a door of a vehicle such as an automobile, in order to decrease the number of components and reduce mounting space, as described in JP 2010-116761 A, there has been known a window regulator which has a driving unit arranged at the bottom end thereof and does not use an outer casing for guiding a routing path of the wire.

Further, in JP 08-226277 A, a window glass regulator is disclosed, in which swaying of an outer casing is suppressed using a clip engaged with an outer circumferential surface of the outer casing disposed between a winding drum and the top end of a guide rail. Further, in JP 08-209746 A, there is disclosed a front window opening and closing device which restricts the amplitude of the wire through a cushion provided in a wire cover provided along the wire drawn out of a wire wind-up portion.

SUMMARY

However, in the window regulator disclosed in JP 2010-116761 A, when the door is closed in a state where the window glass is constrained at the top end of the window, vibrations generated when the door is closed cause a lifting wire to vibrate, and the vibrations of the lifting wire reverberate within the door, thereby generating an abnormal noise.

Further, in JP 08-226277 A, a clip which prevents vibrations of the wire has been disclosed. The clip is, however, to prevent vibrations of the outer casing. As described in JP 08-226277 A, in the case where an outer casing is provided, the abnormal noise described above is not generated since the wire is always in contact with the inner surface of the outer casing. Further, such a clip is not applicable to the window regulator as described in JP 2010-116761 A which does not use an outer casing. On the other hand, in JP 08-209746 A, a cushion for regulating amplitude of the wire has been disclosed. However, since the cushion is provided in a wire cover, space for disposing the cushion is required in the wire cover, which increases the size of the device.

The present invention was conceived considering the aforementioned problems, and an object of the present invention is to provide a window regulator that is easy to manufacture and that can apply tension to wires reliably.

In order to attain the above object, a window regulator of the present invention includes a carrier plate coupled to a window glass of a vehicle, a driving unit configured to drive the carrier plate to lift and lower, a lifting wire having one end coupled to the carrier plate and another end coupled to the driving unit via a direction-changing member, and a lowering wire having one end coupled to the carrier plate and another end coupled to the driving unit. The driving unit is disposed below a lower limit of lifting and lowering of the carrier plate in a lifting and lowering direction of the carrier plate, and an attenuation member is provided on the lifting wire interposed between the direction-changing member and the driving unit, the attenuation member making contact with the lifting wire to attenuate vibrations when the lifting wire vibrates.

(1) According to the window regulator of the present invention, there is provided a driving unit configured to drive a carrier plate coupled to the window glass of a vehicle to lift and lower, the driving unit being disposed below a lower limit of lifting and lowering of the carrier plate in a lifting and lowering direction of the carrier plate. On a lifting wire interposed between a direction-changing member and the driving unit, there is provided an attenuation member making contact with the lifting wire to attenuate vibrations of the lifting wire when the lifting wire vibrates. Thus, even when the door is closed in a state where the window glass is constrained at the top end of the window, the window regulator ensures that vibrations of the wire generated then is attenuated, thereby suppressing the generation of an abnormal noise, and the window regulator having the small number of components and space-saving design can be achieved.

(2) According to the window regulator of the present invention, at least a part of the attenuation member is in contact with the lifting wire, which further ensures that the vibrations of the wire is attenuated.

(3) According to the window regulator of the present invention, the attenuation member has an enclosure surrounding the lifting wire in a circumferential direction. Since space is provided between the lifting wire and the enclosure, the wire makes contact with the enclosure regardless of the vibration direction of the wire, which further ensures that the vibrations of the wire is attenuated.

(4) According to the window regulator of the present invention, the attenuation member has a retainer secured to the lifting wire and is always in contact with the lifting wire, which further ensures that the vibrations of the wire is attenuated, and prevents the attenuation member from falling off the lifting wire.

DETAILED DESCRIPTION OF EMBODIMENTS

Figure 1:
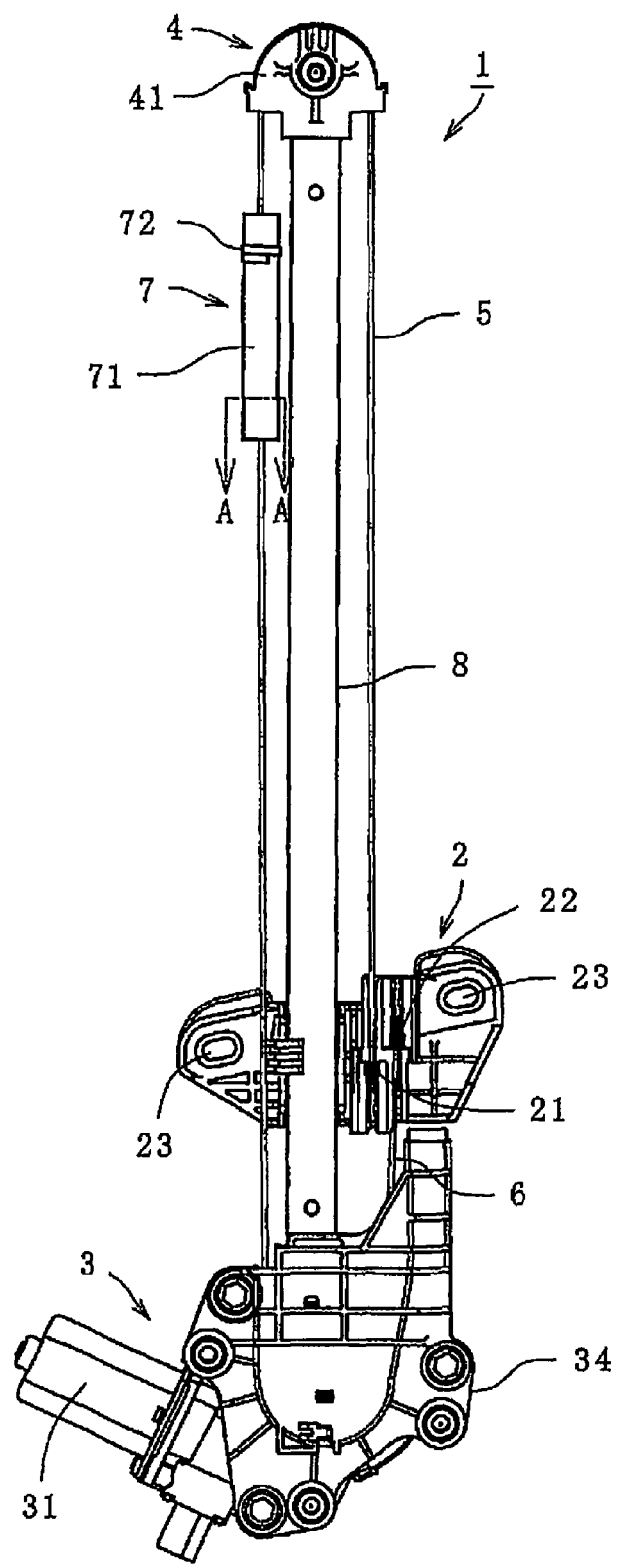
FIG. 1 is a schematic front view illustrating one embodiment of a window regulator according to the present invention.

In the following, an embodiment of the present invention will be described with reference to accompanying drawings. FIG. 1 is a schematic front view illustrating one embodiment of a window regulator 1 of the present invention, which illustrates that a carrier plate 2 is positioned near a lower limit of its lifting and lowering.

A window regulator 1 of the present invention is provided to a door of a vehicle and the like for opening and closing a window glass of the vehicle which is not illustrated. As illustrated in FIG. 1, the window regulator 1 includes a carrier plate 2 coupled to the window glass of the vehicle, a driving unit 3 configured to drive the carrier plate 2 to lift and lower, a lifting wire 5 having one end coupled to the carrier plate 2 and another end coupled to the driving unit 3 via a direction-changing member 4, a lowering wire 6 having one end coupled to the carrier plate 2 and another end coupled to the driving unit 3, and an attenuation member 7 provided on the lifting wire 5 interposed between the direction-changing member 4 and driving unit 3.

As illustrated in FIG. 1, the carrier plate 2 is slidably provided to a guide rail 8 that extends in a vertical direction. This carrier plate 2 has wire attachments 21 and 22 for attaching end portions of the lifting wire 5 and the lowering wire 6 respectively. In addition, on the carrier plate 2, securing holes 23 are formed for securing a window glass which is not illustrated, by a screw or the like.

Figure 2:
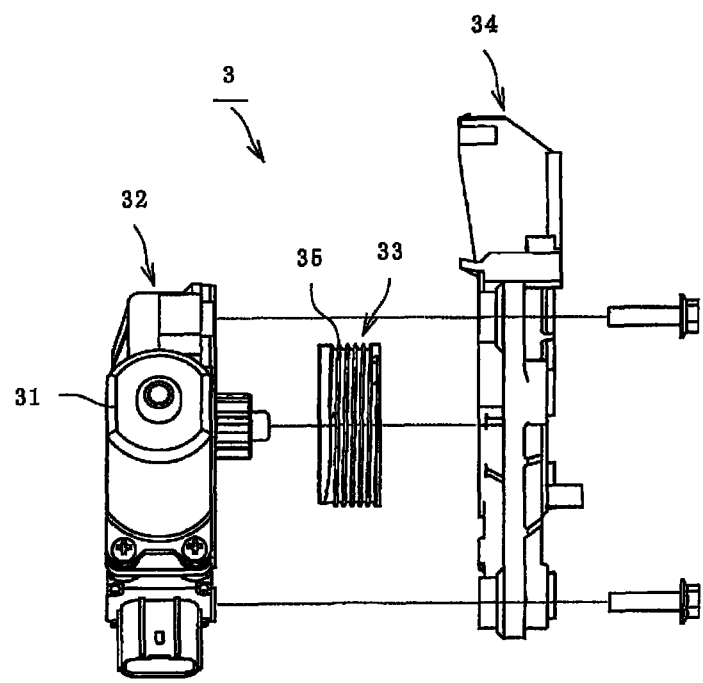
FIG. 2 is an exploded view of a driving unit in FIG. 1.

As illustrated in FIG. 1, the driving unit 3 is mounted on the bottom end of the guide rail 8, and is disposed at a position below the lower limit of the lifting and lowering of the carrier plate 2 in a lifting and lowering direction of the carrier plate 2. In the window regulator 1 of the present invention, since the driving unit 3 is disposed below the lower limit of the lifting and lowering of the carrier plate 2 as described above, it is not necessary to provide an extra direction-changing member on the side towards the bottom end of the guide rail 8, thereby decreasing the number of components and reducing space requirements therefor. In addition, as illustrated in FIG. 1 and FIG. 2, the driving unit 3 includes, for example, a motor 31, a gear housing 32 which houses a reducer such as a worm gear reducer coupled to the motor 31, a drum 33 coupled to an output shaft of the reducer, and a drum housing 34 which houses the drum 33 and is attached to the gear housing 32 with a screw or the like. On the drum housing 34, for example, a groove is formed for inserting and securing the bottom end of the guide rail 8. Further, on the drum 33, an engaging part (not illustrated) for engaging and locking the end portions of the lifting wire 5 and the lowering wire 6, and a helical guide groove 35 are formed for winding the portions of the lifting wire 5 and the lowering wire 6 near the end portions.

The direction-changing member 4 is configured to change direction of the lifting wire 5 while winding the lifting wire 5. Although not illustrated in detail, the direction-changing member 4 includes a rotatably provided pulley and a shaft rotatably supporting the pulley, and is mounted on the top end of the guide rail 8 via a bracket 41. Although the present embodiment has been described with the example where the pulley is rotatably attached to the guide rail 8 via the bracket 41, the pulley may be rotatably attached directly to the guide rail 8.

The lifting wire 5 has one end attached to the wire attachment 21 of the carrier plate 2 and another end engaged and locked by the engaging part of the driving unit 3 via the direction-changing member 4. This lifting wire 5 is of a type with no outer casing which covers an outer circumferential surface thereof. Consequently, the window regulator 1 of the present invention decreases the number of components and reduces manufacturing cost.

The lowering wire 6 has one end attached to the wire attachment 22 of the carrier plate 2, and another end engaged and locked by the engaging part of the driving unit 3.

With such a configuration as described above, in the window regulator 1 of the present invention, the motor 31 drives and rotates the drum 33 via the reduction gear to wind the lifting wire 5 on the drum 33 and to feed the lowering wire 6 from the drum 33 toward the one end, thereby lifting the carrier plate 2. By lifting the carrier plate 2 in the above described manner, the window glass secured to the carrier plate 2 will also be lifted. Further, by rotating the motor 31 in a reverse direction, thereby feeding the lifting wire 5 from the drum 33 toward the one end and winding the lowering wire 6 on the drum 33, the window glass can be lowered.

Further, as described above, in the window regulator 1 having the lifting wire 5 which does not use an outer casing, when the door is closed in a state where the window glass is constrained at the top end of the window, vibrations of the door cause the lifting wire 5 to vibrate, and the vibrations reverberate within the door, thereby generating an abnormal noise. Therefore, in the window regulator 1 of the present invention, as illustrated in FIG. 1, the attenuation member 7 is provided on the lifting wire 5 interposed between the direction-changing member 4 and the driving unit 3.

Figure 3:
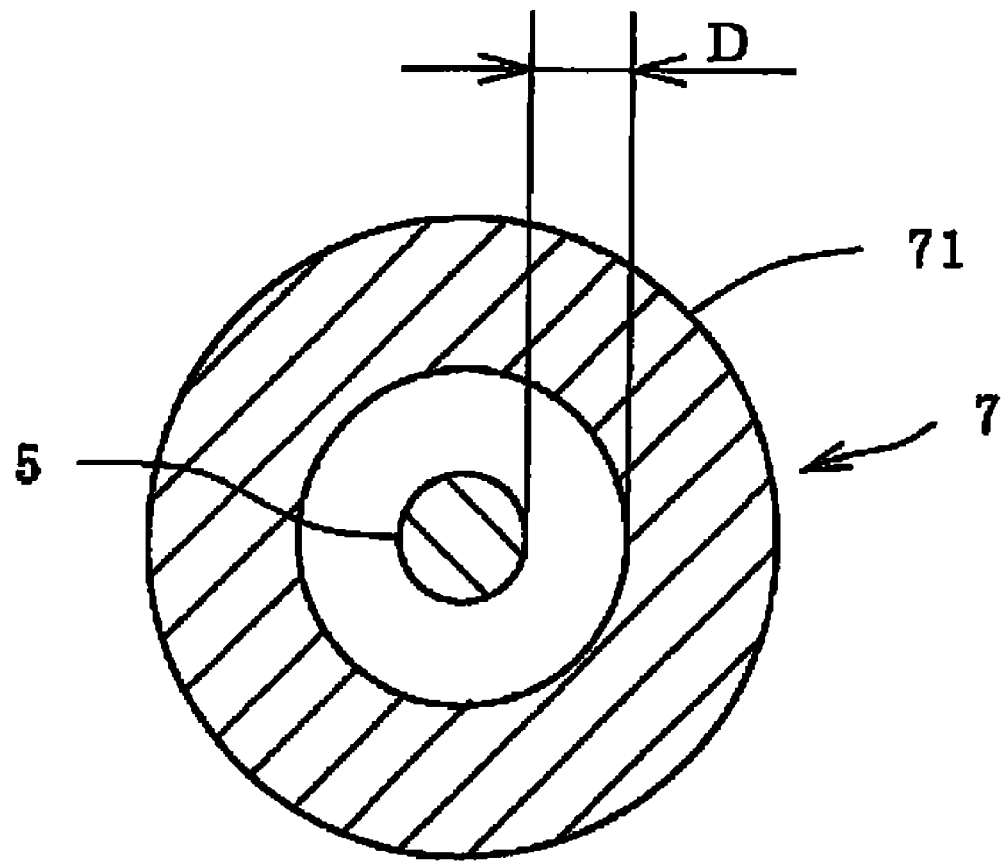
FIG. 3 is an enlarged sectional view taken at line A-A in FIG. 1.

The attenuation member 7 is configured to be in contact with the lifting wire 5 when the lifting wire 5 vibrates, so as to attenuate the vibration of the lifting wire 5. In the present embodiment, as illustrated in FIG. 1 and FIG. 3, the attenuation member 7 is provided on the lifting wire 5 interposed between the direction-changing member 4 and the driving unit 3, and has an enclosure 71 surrounding the lifting wire 5 in a circumferential direction, and a retainer 72 for securing the attenuation member 7 to the lifting wire 5. It is sufficient that, when the lifting wire 5 vibrates, at least a part of the attenuation member 7 makes contact with the lifting wire 5 to attenuate the vibrations of the lifting wire 5. Therefore, the enclosure does not need to surround the lifting wire 5 in a circumferential direction. Further, the attenuation member 7 may not include the retainer 72 so as to move freely on the lifting wire 5.

The enclosure 71 may be made of a flexible material such as resin, elastomer, or rubber. The enclosure 71 is formed in a substantially cylindrical shape as illustrated in FIG. 1 and FIG. 3, and a predetermined space D is provided between the inner circumferential surface of the enclosure 71 and the outer circumferential surface of the lifting wire 5. It is to be noted that the space D between the inner circumferential surface of the enclosure 71 and the outer circumferential surface of the lifting wire 5 is not particularly limited. It is sufficient that the space D is arranged so that the lifting wire 5 makes contact with the inner circumferential surface of the enclosure 71 when the lifting wire 5 vibrates, thereby attenuating the vibrations of the lifting wire 5. The space D may be appropriately arranged according to the shape of the door, the projected amplitude of the lifting wire 5, and the like. Further, the material of the enclosure 71 is not necessarily limited to resin, elastomer, and rubber. Any material that attenuates the vibrations of the lifting wire 5 may be used.

For the retainer 72, materials such as an elongated rubber tube or a wire-formed article may be used. The retainer 72 is attached to the outer circumferential surface of the enclosure 71 to secure the enclosure 71 to the outer circumferential surface of the lifting wire 5 so that the enclosure does not fall off of the lifting wire 5. As described above, by having the retainer 72, the attenuation member 7 is capable of moving integrally with the lifting wire 5 while keeping the space between the lifting wire 5 and the enclosure 71. Even if the lifting wire 5 vibrates, at least a part of the inner circumferential surface of the enclosure 71 is in contact with the lifting wire 5, which ensures that the vibrations of the lifting wire 5 are attenuated. It is to be noted that the configuration of the retainer 72 is not limited to the above. Any configuration may be used, in which the enclosure 71 can be secured so as not to fall off the lifting wire 5 due to its own weight. Also, the shape of the enclosure 71 is not limited to the above. In the case where the vibration direction of the lifting wire 5 is known in advance, it is sufficient that a contact area be formed in that direction only.

As described above, the window regulator 1 of the present invention has the attenuation member 7 on the lifting wire 5. Thus, when the door is closed and vibrations of the door cause the lifting wire 5 to vibrate, the vibration of the lifting wire 5 can be attenuated regardless of the direction in which the lifting wire 5 vibrates, when the lifting wire 5 makes contact with the inner circumferential surface of the enclosure 71. Accordingly, the generation of an abnormal noise can be suppressed.

Figure 4:
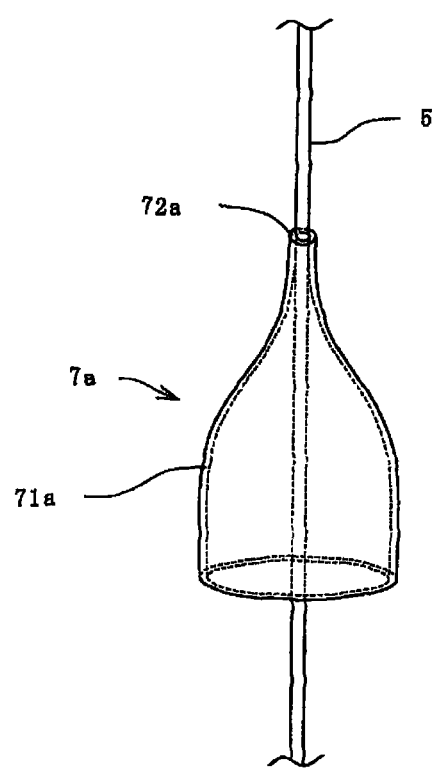
FIG. 4 is a schematic perspective view illustrating a different example of an attenuation member.

FIG. 4 illustrates a different example of an attenuation member 7 (7a). As illustrated in FIG. 4, the attenuation member 7a is formed in a substantially flask-like shape having an open bottom. In a state where a predetermined space is provided, the attenuation member 7a has an enclosure 71a surrounding the lifting wire 5 over the entire circumference in a circumferential direction, and a retainer 72a having an inner circumferential surface which is in contact with the lifting wire 5. Instead of securing the attenuation member 7a on the lifting wire 5 using an elongated rubber tube, a wire, or the like, the attenuation member 7a is secured using friction force between the inner circumferential surface of the retainer 72a and the outer circumferential surface of the lifting wire 5 resulted from inserting the lifting wire 5 into a resilient retainer 72a having an inner diameter in a free state formed slightly smaller than the outer diameter of the lifting wire 5. As described above, in a case where the attenuation member 7a secured on the lifting wire 5 is used as well, when the lifting wire 5 vibrates, since the lifting wire 5 is capable of attenuating the vibrations thereof by making contact with the inner circumferential surface of the enclosure 71a, the generation of an abnormal noise can be suppressed.

It is to be noted that although the window regulator 1 of the present invention uses the guide rail 8, the window regulator 1 may be configured not to use the guide rail 8.

The embodiment of the present invention is not limited to those described above, and modifications can be made appropriately without departing from the spirit and scope of the present invention.

A window regulator according to the present invention can be applied to a vehicle door and the like.

The invention claimed is:

1. A window regulator comprising:
   a carrier plate coupled to a window glass of a vehicle;
   a driving unit configured to drive the carrier plate to lift and lower the carrier plate, and disposed below a lower limit of lifting and lowering of the carrier plate in a lifting and lowering direction of the carrier plate;
   a lifting wire having one end coupled to the carrier plate and another end coupled to the driving unit via a direction-changing member;
   a lowering wire having one end coupled to the carrier plate and another end coupled to the driving unit; and
   an attenuation member provided on the lifting wire interposed between the direction-changing member and the driving unit, the attenuation member including an enclosure having an inner circumferential surface that makes contact with the lifting wire to attenuate vibrations when the lifting wire vibrates, the attenuation member moving together with the lifting wire while keeping a space between the lifting wire and the enclosure, the enclosure surrounding the lifting wire in a circumferential direction, and the space between the lifting wire and the enclosure being defined such that the lifting wire comes into contact with the inner circumferential surface of the enclosure when the lifting wire vibrates and the lifting wire remains out of contact with the inner circumferential surface of the enclosure when the lifting wire does not vibrate.

2. The window regulator according to claim 1, wherein at least a part of the attenuation member is in contact with the lifting wire.

3. The window regulator according to claim 1, wherein the attenuation member has a retainer secured to the lifting wire.

\* \* \* \* \*